US008891591B2

(12) United States Patent
Balraj et al.

(10) Patent No.: US 8,891,591 B2
(45) Date of Patent: Nov. 18, 2014

(54) RECEIVER CIRCUIT AND METHOD (75) Inventors: Rajarajan Balraj, Duesseldorf (DE);
Thorsten Clevorn, Duesseldorf (DE);
Herbert Dawid, Herzogenrath (DE)

(73) Assignee: Intel Mobile Communications GmbH,
Neubiberg (DE)

( * ) Notice: Subject to any disclaimer, the term of this patent is extended or adjusted under 35 U.S.C. 154(b) by 310 days.

(21) Appl. No.: 13/169,311

(22) Filed: Jun. 27, 2011

(65) Prior Publication Data

US 2012/0328059 A1  Dec. 27, 2012

(51) Int. Cl.
*H04B 1/00*  (2006.01)
*H04L 25/06*  (2006.01)

(52) U.S. Cl.
CPC .................................. *H04L 25/061* (2013.01)
USPC ........... 375/148; 375/152; 375/224; 375/340; 375/343; 375/346

(58) Field of Classification Search
CPC .. H04B 17/0055; H04L 5/006; H04L 25/061; H04L 5/0023
USPC ................. 375/148, 346, 152, 224, 340, 343
See application file for complete search history.

(56) References Cited

U.S. PATENT DOCUMENTS

| | | | |
|---|---|---|---|
| 7,706,824 B2 * | 4/2010 | Schulist et al. ............... | 455/517 |
| 2007/0147266 A1 | 6/2007 | Bachl et al. | |
| 2007/0171847 A1 * | 7/2007 | Demaj et al. .................. | 370/310 |
| 2007/0287382 A1 * | 12/2007 | Catreux-Erceg et al. .... | 455/63.1 |
| 2010/0182974 A1 * | 7/2010 | Barraclough et al. ........ | 370/329 |
| 2012/0163512 A1 * | 6/2012 | Johansson et al. ............ | 375/340 |

FOREIGN PATENT DOCUMENTS

WO        2007028279 A1     3/2007

OTHER PUBLICATIONS

Ericsson, "Enhanced Uplink for Cell_FACH State in FDD"; 3GPP Draft; R1-075000, 3rd Generation Partnership Project (3GPP), Mobile Competence Centre; 650, Route Des Lucioles; F-06921 Sophia-Antipolis Cedex; France, Oct. 30, 2007.
International Search Report dated Sep. 28, 2012 in connection with PCT Patent Application No. PCT/EP2012/061985.
3 GPP TS 25.211: "Physical Channels and Mapping of Transport Channels Onto Physical Channels (FDD)."
3 GPP TS 25.101: "UE Radio Transmission and Reception (FDD)."

* cited by examiner

*Primary Examiner* — Dhaval Patel
(74) *Attorney, Agent, or Firm* — Eschweiler & Associates, LLC (57) ABSTRACT

A receiver circuit includes an estimation unit configured to estimate a noise power of a transmission channel, a calculation unit configured to calculate a decision variable based on the noise power, and a decision unit configured to make a ternary decision based on the decision variable.

18 Claims, 5 Drawing Sheets

Fig. 9

RECEIVER CIRCUIT AND METHOD

FIELD

The invention relates to mobile communications. In particular, the invention relates to a receiver circuit and a method performed by a receiver circuit.

BACKGROUND

During an operation of a receiver circuit, data has to be detected. The related detection processes may be based on a decision variable.

Receivers constantly have to be improved, for example with regard to their performance and their reception quality. In particular, the improvement of detection processes in a receiver circuit is desirable. For these and further reasons there is a need for the present invention.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

As employed in this specification, the terms "coupled", "electrically coupled", "connected" or "electrically connected" are not meant to mean that the elements must be directly coupled or connected together. Intervening elements may be provided between the "coupled", "electrically coupled", "connected" or "electrically connected" elements.

The methods and devices described herein may be used for various wireless communication networks such as Code Division Multiple Access (COMA), Time Division Multiple Access (TDMA), Frequency Division Multiple Access (FDMA), Orthogonal FDMA (OFDMA) and Single Carrier FDMA (SC-FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The above mentioned standards are, inter alia, described in documents provided by the "3rd Generation Partnership Project" (3GPP) organization. In particular, the contents of the documents 3GPP TS 25.211 version 9.2.0 Release 9; Universal Mobile Telecommunications System (UMTS); Physical channels and mapping of transport channels onto physical channels (FDD) and 3GPP TS 25.101 version 9.6.0 Release 9; Universal Mobile Telecommunications System (UMTS); User Equipment (UE) radio transmission and reception (FDD) are included herein by reference.

In radio communications systems a transmitter transmitting one or more radio communications signals on one or more radio communications channels (or radio transmission channels) may be present. In particular, the transmitter may be a base station or a transmitting device included in a user's device, such as a mobile radio transceiver, a handheld radio device or any similar device. According to the UMTS standard, a transmitter or base station may also be referred to as "Node B". Radio communications signals transmitted by transmitters may be received by receivers such as a receiving device in a mobile radio transceiver, a handheld radio device or any similar device. In particular, radio communications systems as disclosed herein may include UMTS systems which may conform to the 3GPP standard for UMTS systems. According to the UMTS standard, a receiver or mobile station may also be referred to as "User Equipment" (UE). Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

Figure 1:
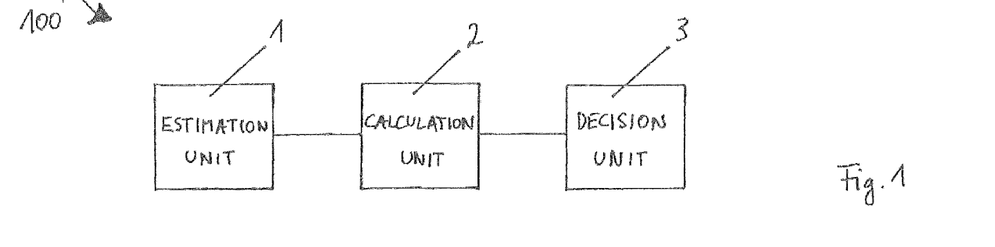
FIG. 1 schematically illustrates a receiver circuit 100 as an exemplary embodiment.

FIG. 1 schematically illustrates a receiver circuit 100 including an estimation unit 1, a calculation unit 2 and a decision unit 3. It is understood that the receiver circuit 100 may include further components which are not illustrated for the sake of simplicity. For example, the receiver circuit 100 may include one or more of the components described in connection with FIG. 4.

The estimation unit 1 is configured to estimate a noise power of a transmission channel, in particular a radio communications physical channel, which may be used for a data transmission between a transmitter and a receiver. For example, the transmission channel may be a multichannel (or multipath channel) wherein a signal is transmitted over multiple transmission paths (or multiple propagation paths) of the transmission channel. In this case, the noise power of the transmission channel may comprise noise power(s) of one or more transmission path(s) of the multichannel. Exemplary equations for estimating a noise power are given below. The calculation unit 2 is configured to calculate a decision variable depending on a noise power. The calculation unit 2 may include one or more components and may be implemented in software or hardware or both. An example for implementing the calculation unit 2 is described in connection with FIG. 4. In addition, exemplary equations for calculating an exemplary decision variable are given below. The decision unit 3 is configured to make a ternary decision depending on a decision variable. Here, the term "ternary" may relate to a three-valued logic in which there are three (logical) values indicating "true", "false" and an indeterminate third value. For example, the values of the ternary decision may take the values of "1", "−1" and "0". An example for a ternary decision as well as an exemplary embodiment of the decision unit 3 are described in connection with FIG. 4.

In one exemplary embodiment, the transmission channel may be a multipath channel including at least two transmission paths (or propagation paths). The estimation unit 1 may then be configured to estimate a first noise power of a first transmission path and a second noise power of a second transmission path. In this case, the calculation unit 2 may be configured to calculate a decision variable depending on the first noise power and the second noise power. The decision unit 3 may again be configured to perform a ternary decision depending on the decision variable. Note that the embodiment may also be practiced if only one transmission path is available.

Figure 2:
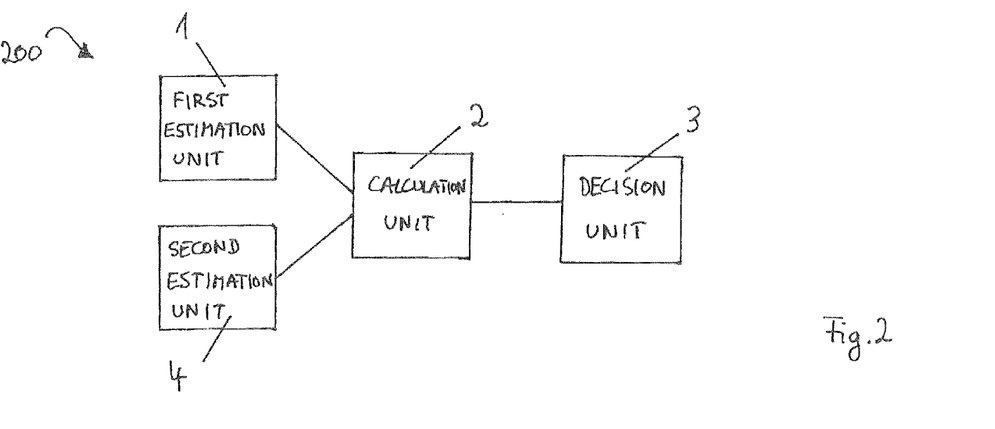
FIG. 2 schematically illustrates a receiver circuit 200 as a further exemplary embodiment.

FIG. 2 schematically illustrates a receiver circuit 200 including a first estimation unit 1, a calculation unit 2 and a decision unit 3 which may correspond to similar components of FIG. 1. Compared to FIG. 1, the receiver circuit 200 additionally includes a second estimation unit 4 which is configured to estimate a (channel) power of a physical channel, in particular of an Acquisition Indicator Channel (AICH). Further, the decision variable calculated by the calculation unit 2 additionally depends on the (channel) power of the physical channel. Properties of an AICH are explained in the following.

In a communications system connections between a mobile station and a base station may be established via a Physical Random Access Channel (PRACH) and an AICH. Before the mobile station accesses the radio network and initiates a transmission on a dedicated channel, it has to become noticeable for the base station using a physical random access procedure. For this purpose, the mobile station transmits a PRACH signal including a Random Access Channel (RACH) preamble to a base station in order to request a connection. The RACH preamble may have a length of 4096 chips and may consist of 256 repetitions of a signature having a length of 16 chips. Note that, if it is not possible for the mobile station to accurately predict the transmission power required for the RACH transmission to be heard by the base station, the mobile station may increase the power level of the transmission until it receives an acknowledgment from the base station. When the base station detects a RACH preamble, the base station sends an acknowledgment in the form of Acquisition Indicators (AI) over the AICH. The AIs are mapped to the AICH transmitted on the downlink. For example, each AI may take a value of "1", "−1" or "0" wherein a value of "1" corresponds to a positive acknowledgment, a value of "−1" corresponds to a negative acknowledgment and a value of "0" corresponds to no acknowledgment (DTX) which means that the base station has not detected a RACH preamble.

Figure 3:
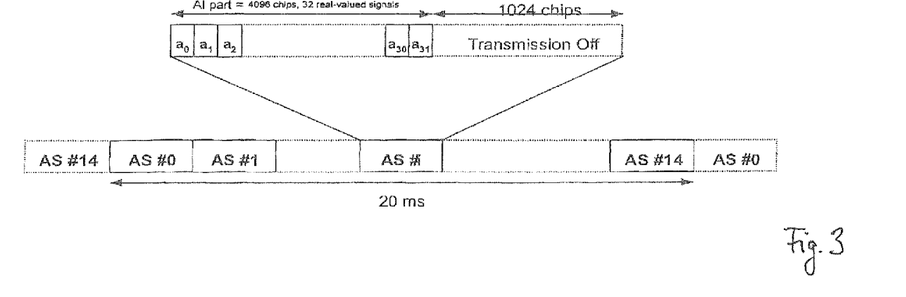
FIG. 3 schematically illustrates a structure of an Acquisition Indicator Channel (AICH).

FIG. 3 schematically illustrates a structure of an AICH as a fixed rate physical channel that may be based on a spreading factor of 256. In addition, the AICH structure may be based on a repeated sequence of 15 consecutive access slots (AS) each having a length of 5120 chips. In the lower part of FIG. 3, 15 consecutive access slots AS#0 to AS#14 having an overall duration of 20 ms (milliseconds) are illustrated. The upper part of FIG. 3 further illustrates a more detailed structure of an access slot (see access slot AS#i). The access slot may include an AI part having a length of 4096 chips and consisting of 32 real valued symbols $a_0$ to $a_{31}$ as well as a further part having a length of 1024 chips with no transmission (see "Transmission Off").

The real valued symbols $a_0$ to $a_{31}$ may be written as $$a_j = \sqrt{P_{AICH-CPICH}} \left( \sum_{s=0}^{15} AI_s b_{s,j} \right) \qquad (1)$$

wherein $P_{AICH-CPICH}$ denotes the (linear) power offset between the AICH and a Common Pilot Channel (CPICH) which may be signaled (e.g. in dB) from the base station to the mobile station. The Acquisition Indicators $AI_s$ have a ternary symbol source and may take the values "1", "−1" and "0". The values of the sequences (or signature patterns) $b_{s,j}$ are specified in the document 3GPP TS 25.211 version 9.2.0 Release 9; Universal Mobile Telecommunications System (UMTS); Physical channels and mapping of transport channels onto physical channels (FDD) which is included herein by reference.

Figure 4:
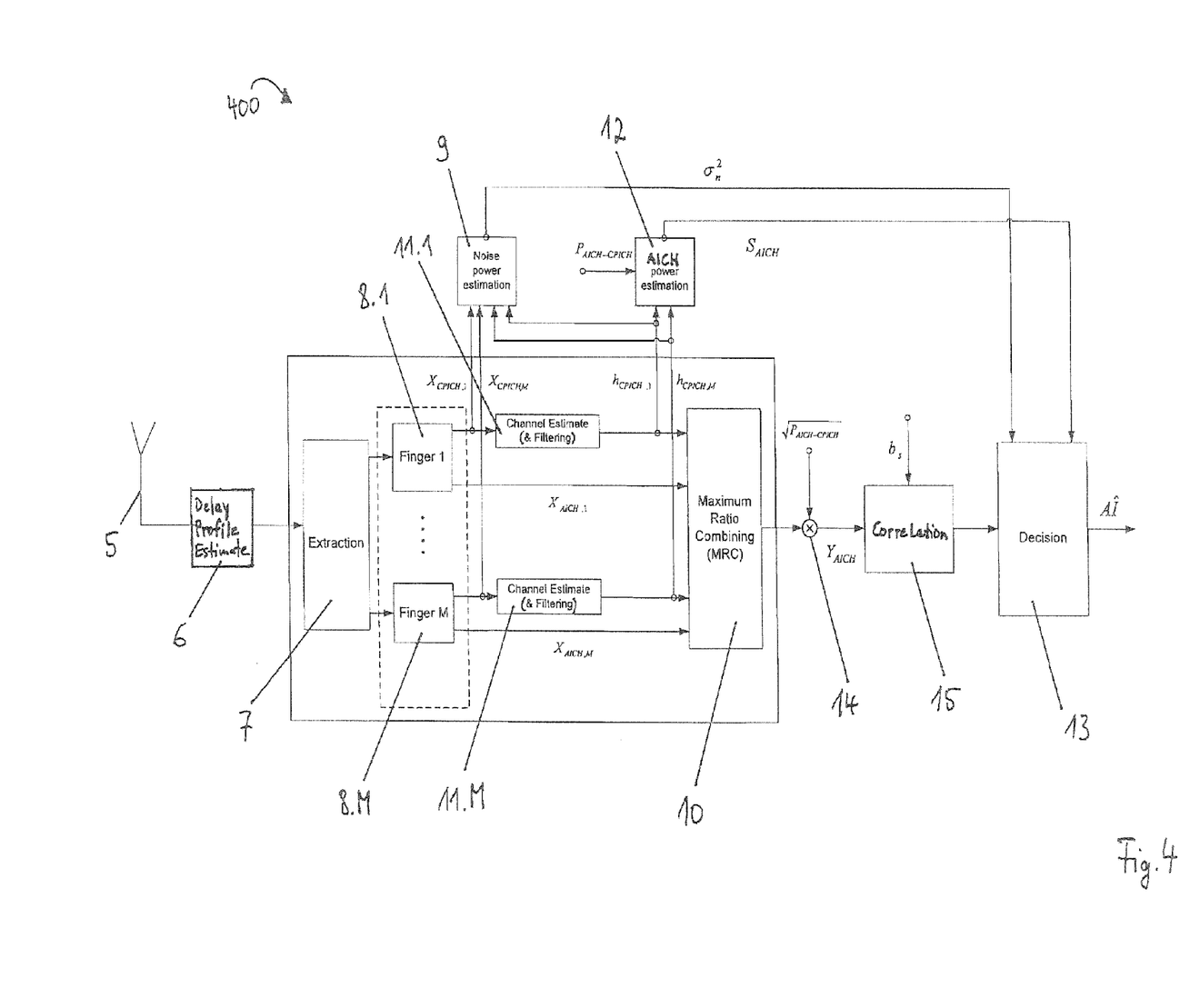
FIG. 4 schematically illustrates a receiver 400 including a receiver circuit as a further exemplary embodiment.

FIG. 4 schematically illustrates a receiver 400 which includes a receiver circuit as a further exemplary embodiment. The receiver 400 includes an antenna 5 configured to receive signals sent over a transmission channel. It is understood that the receiver 400 may include further antennas. For example, the receiver 400 may be operated according to a Multiple Input Multiple Output (MIMO) technique providing the use of multiple antennas at both the transmitter and receiver. Usually the antenna 5 receives analog signals in a radio frequency range which are first down-converted into an intermediate frequency band or into the baseband by a down-conversion unit (not shown). After down-conversion, an analog signal is usually converted to a digital signal by means of an Analog-to-Digital Converter (ADC) (not shown) to provide digital samples. Of course, the receiver 400 may further include amplifiers, analog filters, digital filters, etc.

The antenna 5 is coupled to a delay profile estimator 6 that is configured to detect a delay profile including information on path delays of multiple propagation paths of a multipath channel. Due to the multiple propagation paths, the antenna 5 receives multiple images (or versions or echoes) of a signal transmitted by a transmitter (not shown) with each signal image generally suffering from a different path delay. The delay profile estimator 6 is coupled to an extraction unit 7 that is configured to separate the received signal into multiple signals, each of these multiple signals being assigned to one specific path delay (i.e. one specific propagation path).

Each of the multiple signals output by the extraction unit 7 is input to a respective one of RAKE fingers 8.1 to 8.M such that each of the RAKE fingers 8.1 to 8.M is allocated to a particular one of the propagation paths of the signal received at the antenna 5. That is, each of the RAKE fingers 8.1 to 8.M receives its own image (or version) of the originally transmitted signal. Note that each of the RAKE fingers 8.1 to 8.M may be time-aligned to process its input signal at an assigned path delay. For this purpose, each one of the RAKE fingers 8.1 to 8.M may include delay elements (not shown) to delay the digital signals corresponding to the respective delays between the multiple propagation paths.

Each one of the extracted signals is despread in a respective one of the RAKE fingers 8.1 to 8.M using despreaders (or correlators) (not shown). The despreaders correlate the received spread signals with a chip sequence to obtain corresponding despread signals. The chip sequence may be generated by a chip sequence generator (not shown). In a similar manner, each of the RAKE fingers 8.1 to 8.M may further include descrambling units which are configured to descramble signals using a scrambling code. Each of the RAKE fingers 8.1 to 8.M includes one or more outputs providing the quantities $X_{CPICH,l,i}$ and $X_{AICH,l,i}$, respectively. Here, the quantities $X_{CPICH,l,i}$ and $X_{AICH,l,i}$ correspond to a despread symbol of the CPICH and the AICH for the l-th transmission path (i.e. the l-th RAKE finger) and the i-th sample, respectively. Note that, for the sake of simplicity, the index i is suppressed in FIG. 4.

The quantities $X_{CPICH,l,i}$ and $X_{AICH,l,i}$ output by the RAKE fingers 8.1 to 8.M are forwarded to a first estimation unit 9 and a maximum ratio combiner (MRC) 10, respectively. In addition, each of the RAKE fingers 8.1 to 8.M forwards its respective quantity $X_{CPICH,l,i}$ to a respective one of units 11.1 to 11.M. Each of the units 11.1 to 11.M includes a channel estimation unit (not shown) and may include one or more filters. Each of the channel estimation units is configured to generate channel estimates $h_{CPICH,l,i}$ for the l-th transmission path (i.e. the l-th RAKE finger) and the i-th sample based on the following relations.

The quantity $X_{CPICH,l,i}$ may be written as $$X_{CPICH,l,i} = h_{CPICH,l,i} x_{Pilot} + n_l \quad (2)$$

wherein $h_{CPICH,l,i}$ denotes the channel estimate for the CPICH for the l-th transmission path (i.e. the l-th RAKE finger) and the i-th sample. Further, $x_{Pilot}$ denotes the CPICH pilot symbols known in the receiver 400 and $n_l$ denotes additive white Gaussian noise for the l-th transmission path. The quantity $h_{CPICH,l,i}$ may be written as $$h_{CPICH,l,i} = \sqrt{P_{CPICH}} h_{l,i} \quad (3)$$

wherein $P_{CPICH}$ denotes the power of the CPICH and $h_{l,i}$ denotes a channel transfer function for the l-th transmission path and the i-th sample.

The channel estimates $h_{CPICH,l,i}$ output by the units 11.1 to 11.M are forwarded to the first estimation unit 9, the MRC 10 and a second estimation unit 12, respectively. The first estimation unit 9 thus receives the quantities $X_{CPICH,1,i}$ to $X_{CPICH,M,i}$ and $h_{CPICH,1,i}$ to $h_{CPICH,M,i}$ as well as the known CPICH pilot symbols $X_{Pilot}$ (not shown). Using these quantities, the first estimation unit 9 is configured to calculate an estimated noise power $\sigma_l^2$ for the l-th transmission path which may be written as $$\sigma_l^2 = E((X_{CPICH,l} - h_{CPICH,l} x_{Pilot})^H ((X_{CPICH,l} - h_{CPICH,l} x_{Pilot}))). \quad (4)$$

Here, E denotes the expectation value and the superscript H denotes hermitian transposition. The noise powers $\sigma_l^2$ of the transmission paths may be averaged according to $$\sigma_n^2 = \frac{1}{M} \sum_{l=1}^{M} \sigma_l^2 \quad (5)$$

and forwarded to a decision unit 13.

The second estimation unit 12 receives the quantities $h_{CPICH,1,i}$ to $h_{CPICH,M,i}$ and the power offset $P_{AICH-CPICH}$ (see equation (1)). The second estimation unit 12 is configured to calculate a quantity $S_{AICH}$ according to $$S_{AICH} = \frac{16 \times \frac{P_{AICH-CPICH}}{N} \sum_{j=1}^{N} \sum_{l=1}^{M} h_{CPICH,l,j}^h h_{CPICH,l,j}}{\sqrt{2}} \quad (6)$$

with the first sum running over a number N of measurement samples and the second sum running over M propagation paths.

By using the relation $$h_{AICH,l,i} = \sqrt{P_{AICH-CPICH}} h_{CPICH,l,i}, \quad (7)$$

equation (6) may also be written as $$S_{AICH} = \frac{\frac{16}{N} \sum_{j=1}^{N} \sum_{l=1}^{M} h_{AICH,l,j}^h h_{AICH,l,j}}{\sqrt{2}} \quad (8)$$

wherein $h_{AiCH,M,i}$ denotes the channel estimate for the AICH, thereby accounting for the power offset between the AICH and the CPICH. The quantity $S_{AICH}$ is forwarded to the decision unit 13.

The MRC 10 receives the quantities $X_{AICH,1,i}$ to $X_{AICH,M,i}$ as well as $h_{CPICH,1,i}$ to $h_{CPICH,M,i}$ and generates an output signal which is multiplied by the factor $\sqrt{P_{AICH-CPICH}}$ (see multiplier 14). The multiplied signal output by the multiplier 14 may be written as $$Y_{AICH,i} = \sqrt{P_{AICH-CPICH}} \sum_{l=1}^{M} \frac{(h_{CPICH,l,j}^h h_{AICH,l,i}) b_{s,i} a_i}{\sqrt{2}} + n^* \quad (9)$$

wherein n* denotes the noise seen by the receiver after maximum ratio combining. Since equation (9) may particularly be real-valued, n' may represent a real-valued noise. Note that the quantities $X_{AICH,1,i}$ to $X_{AICH,M,i}$ correspond to the despread AICH symbols $a_t$ (see also equation (1)). Combining equations (7) and (9), $Y_{AICH}$ may also be written as $$Y_{AICH,i} = \sum_{l=1}^{M} \frac{(h^h_{AICH,l,i} h_{AICH,l,i}) b_{s,i} a_i}{\sqrt{2}} + n^*. \quad (10)$$

The quantity $Y_{AICH}$ is forwarded to a correlation unit 15 which is configured to perform a correlation between the quantity $Y_{AICH}$ and a signature $b_s$ (see equation (1)) of the AICH. The correlated signal output by the correlation unit 15 may be written as $$K = \sum_{i=1}^{32} b_{s,i} Y_{AICH,i} \quad (11)$$

and is forwarded to the decision unit 13.

The decision unit 13 thus receives the output of the correlation unit 15 as well as the quantities $\sigma_n^2$ and $S_{AICH}$ provided by the first estimation unit 9 and the second estimation unit 12, respectively. The decision unit 13 is configured to calculate a decision variable $Z_{AICH}$ according to $$Z_{AICH} = \frac{\sum_{i=1}^{32} b_{s,i} Y_{AICH,i}}{S_{AICH} + \sigma_n^2 \times \eta} \quad (12)$$

wherein $\eta \geq 0$ and in particular $$\eta = \frac{1}{\sqrt{2}}$$

or $\eta = 1$.

Based on the decision variable $Z_{AICH}$, a ternary decision for an Acquisition Indicator AI may be made. In particular, the ternary decision may be made for each access slot of the AICH and may be based on the relation $$AI = \begin{cases} +1 & Z_{AICH} \geq +C \\ 0 & -C < Z_{AICH} < +C \\ -1 & Z_{AICH} \leq -C \end{cases} \quad (13)$$

The variable C represents a threshold value. Generally, it may be a constant or may depend on a noise power and/or a channel power. For example, it may be written as $$C = C_{MMSE} = 0.5 \times \beta \quad (14)$$

wherein $\beta \geq 0$ and in particular $\beta = 1$. Note that, due to equations (4) and (5), the threshold value of equation (14) may also be denoted as $C_{MMSE}$ (MMSE: Minimum Mean Square Error).

It is understood that there are further possibilities to specify the threshold value C, for example via the relation $$C = C_{MAP} = 0.5. \quad (15)$$

In this case, a corresponding decision unit may then be based on a Euclidean distance metric and may be referred to as MAP (Maximum A Posteriori) detector.

The threshold value C may also be given by $$C = C_{CFAR} = \pm Q^{-1}\left(\frac{FAR}{2}\right) \cdot \frac{\sqrt{S_{AICH} \sigma_n^2}}{S_{AICH}} \quad (16)$$

wherein Q denotes the Q-function known from statistics and $0 \leq FAR \leq 1$. A corresponding decision unit may be referred to as CFAR (Constant False Alarm Rate) detector.

It is further understood that the calculation of the decision variable $Z_{AICH}$ may deviate from equation (12). For example, the decision variable $Z_{AICH}$ may be computed according to $$Z_{AICH} = \frac{\sum_{i=1}^{32} b_{s,i} Y_{AICH,i}}{S_{AICH}}, \quad (17)$$

i.e. by not taking into account the variable $\sigma_n^2$.

In the following, different possibilities for calculating the threshold value C and the decision variable $Z_{AICH}$ are compared. For this purpose, in each of FIGS. 5 to 7, various error probabilities are plotted against a geometry factor for three scenarios. The probabilities or performance metrics may be used as a measure of the reliability of a detector. The plotted probabilities are: The probability of missed detection $P_{md}$, i.e. the probability that a base station sent a value of "1" or "−1" for an Acquisition Indicator, but a value of "0" (DTX) was received. The probability of false alarms $P_{fa}$, i.e. the probability that a value of "0" (DTX) was sent, but a value of "1" or "−1" was received. The probability of wrong detection $P_{wd}$, i.e. the probability that a value of "1" or "−1" was sent, but a value of "−1" or "1" was received, respectively. Each of the probabilities is plotted for the case of a detector which is based on equations (15) and (17) (see MAP-Pfa, MAP-Pmd, MAP-Pwd), for the case of a detector based on equations (16) and (17) (see CFAR-Pfa, CFAR-Pmd, CFAR-Pwd) and a detector based on equations (12) and (14) (see MMSE-Pfa, MMSE-Pmd, MMSE-Pwd). All detectors are based on equation (13).

Figure 5:
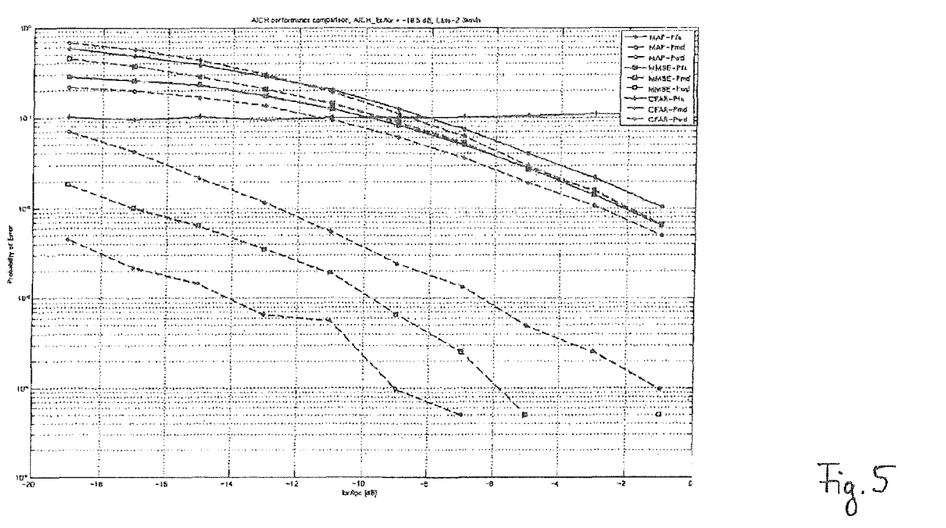
FIG. 5 schematically illustrates error probabilities plotted against a geometry factor for a first scenario.
Figure 6:
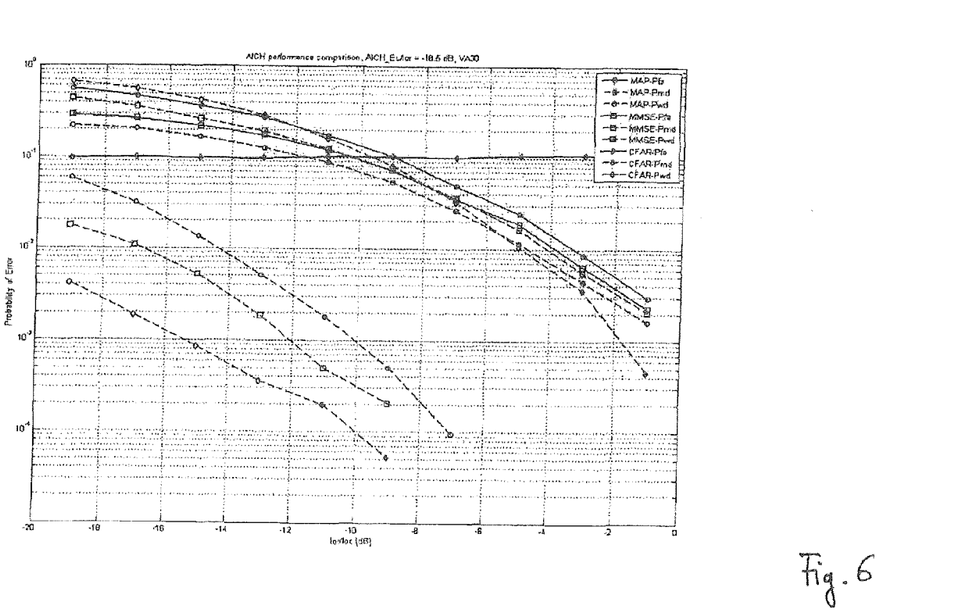
FIG. 6 schematically illustrates error probabilities plotted against a geometry factor for a second scenario.
Figure 7:
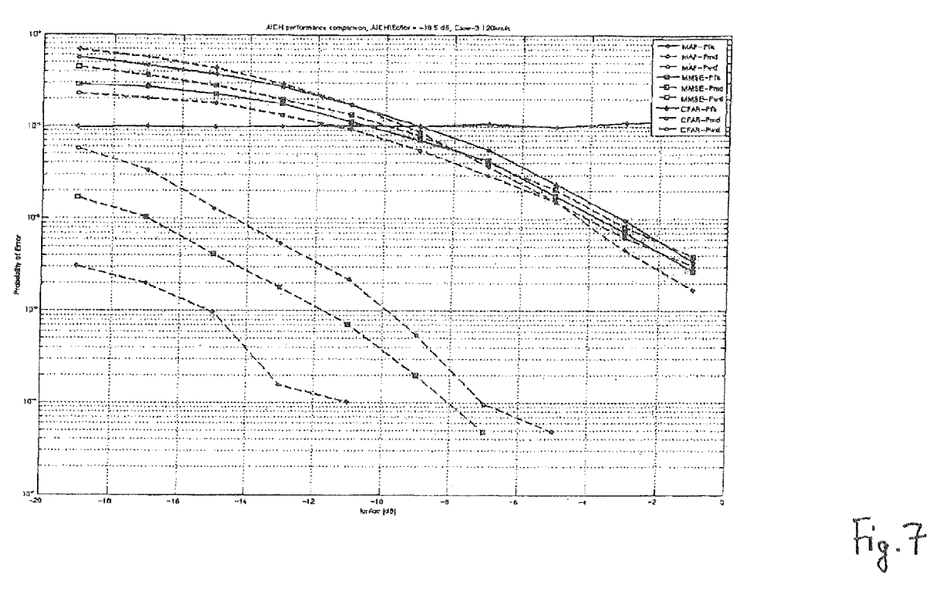
FIG. 7 schematically illustrates error probabilities plotted against a geometry factor for a third scenario.

The geometry factor of FIGS. 5 to 7 corresponds to a ratio Ior/Iocii wherein Ior denotes the total transmit power spectral density on the forward link at the base station antenna connector. For transmit diversity test cases, Ior is the total combined transmit power spectral density of the forward COMA Channel from both the main and transmit diversity base station antenna connectors. Further, Ioc denotes the power spectral density of a band limited white noise source (simulating interference from other cells) as measured at the mobile station antenna connector. For test cases where multiple channels or cells are specified, this power spectral density does not include power from these multiple channels or cells.

Each of FIGS. 5 to 7 represents a performance comparison for an AICH between the mentioned detector types. Note that the underlying scenarios are specified in the document 3GPP TS 25.101 version 9.6.0 Release 9; Universal Mobile Telecommunications System (UMTS); User Equipment (UE) radio transmission and reception (FDD) which is included herein by reference.

FIG. 5 refers to a first scenario assuming Case-2 (see 3GPP document), a receiver having a velocity of 3 km/h and a value of −18.5 db for the quantity AICH_Ec/Ior, i.e. the ratio between the energy on the AICH accumulated over one PN chip period to the total transmit power spectral density. FIG. 6 refers to a second scenario assuming ITU VA 30 (see 3GPP document) and a value of −18.5 db for the quantity AICH_Ec/Ior. FIG. 7 refers to a third scenario assuming Case-2, a receiver having a velocity of 120 km/h and a value of −18.5 db for the quantity AICH_Ec/Ior.

From FIGS. 5 to 7, the following conclusions may be implied. A MAP detector exhibits good performance at higher geometries, but the detection reliability degrades at lower geometries (i.e. high false alarms and wrong detection probabilities). A CFAR detector may be used to set a constant false alarm probability across the range of a Signal to Noise Ratio (SNR) such that resultant missed detection probability is automatically determined. The CFAR detector may provide reliable detection at lower geometries (i.e. low false alarms and wrong detection probabilities), but is highly inflexible due to the fact that the false alarm rate is the design parameter.

Comparing the MMSE detection to the MAP detection and the CFAR detection, the MMSE detection improves the reliability of the ternary detection both at higher and lower geometries (i.e. low false alarms and wrong detection probabilities). In addition, considering all performance metrics, a more balanced detection is provided. Further, over all geometries a more reliable detection is provided. Comparing the MMSE detection to the MAP detection, the MMSE detection exhibits a better detection performance for the probability of wrong detection wherein the performance gain may be in the range of 2 to 4 dB. In addition, the bias between the probability of false alarm and the probability of missed detection may be reduced.

Figure 8:
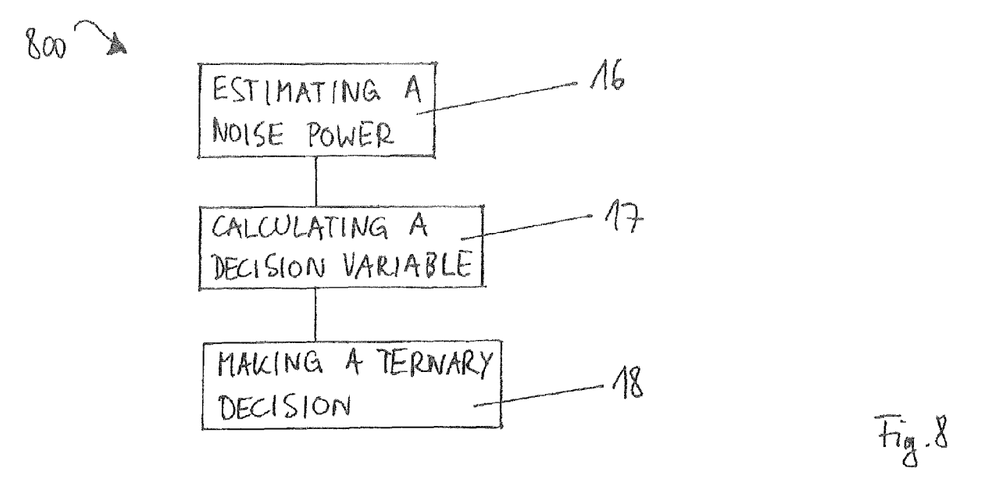
FIG. 8 schematically illustrates a method 800 as an exemplary embodiment.

FIG. 8 schematically illustrates a method 800 in the form of a flow chart as an exemplary embodiment. The flow chart of FIG. 8 may be read in connection with the receiver circuit 100 of FIG. 1 in one embodiment, but is not so limited. In a first method step 16, a noise power of a transmission channel is estimated (see estimation unit 1 of FIG. 1). In a second step 17, a decision variable depending on the noise power is calculated (see calculation unit 2 of FIG. 1). In a third method step 18, a ternary decision depending on the decision variable is made (see decision unit 3 of FIG. 1).

Figure 9:
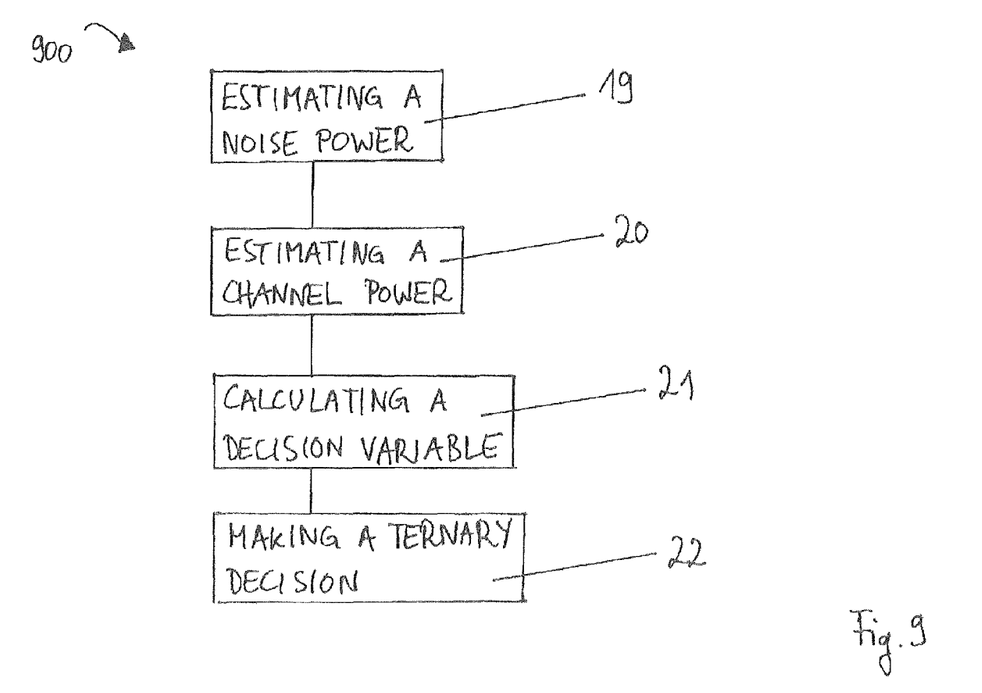
FIG. 9 schematically illustrates a method 900 as a further exemplary embodiment.

FIG. 9 schematically illustrates a method 900 in the form of a flow chart as a further exemplary embodiment. The flow chart of FIG. 9 may be read in connection with the receiver circuit 200 of FIG. 2 in one embodiment, but is not so limited. In a first method step 19, a noise power of a transmission channel is estimated (see first estimation unit 1 of FIG. 2). In a second method step 20, a (channel) power of a physical channel, in particular an AICH, is estimated (see second estimation unit 4 of FIG. 2). Note that the arrangement of method steps 19 and 20 in FIG. 9 does not necessarily imply that method step 20 is performed after method step 19. Rather, it is also possible that method step 19 is performed after method step 20 or at least parts of both method steps 19 and 20 are performed at the same time. In a third method step 21, a decision variable depending on the noise power the transmission channel and the (channel) power of the physical channel is calculated (see calculation unit 2 of FIG. 2). In a fourth method step 22, a ternary decision depending on the decision variable is made (see decision unit 3 of FIG. 2).

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A receiver circuit, comprising:
a first estimation unit configured to estimate a noise power of a transmission channel used for a data transmission received at the receiver;
a calculation unit configured to calculate a decision variable based on the noise power;
a decision unit configured to make a ternary decision based on the decision variable; and
a channel estimation unit configured to estimate a channel coefficient and provide the channel coefficient to a second estimation unit configured to estimate a channel power of a physical channel, and provide the channel coefficient to a maximum ratio combiner.

2. The receiver circuit of claim 1, wherein the transmission channel is an Acquisition Indicator Channel having a repeated sequence of access slots, and the ternary decision is made for each access slot of the Acquisition Indicator Channel.

3. The receiver circuit of claim 1, wherein the transmission channel is an Acquisition Indicator Channel and the ternary decision comprises deciding a value of an Acquisition Indicator over the Acquisition Indicator Channel indicating whether or not a predetermined signature was received.

4. The receiver circuit of claim 1, wherein the decision unit is configured to make the ternary decision by comparing the decision variable to a threshold value.

5. The receiver circuit of claim 4, wherein the threshold value is a constant.

6. The receiver circuit of claim 1, further comprising:
a correlation unit configured to perform a correlation between a signal corresponding to a transmission received at the receiver and a signature of an Acquisition Indicator Channel, and provide the correlation to the decision unit, and wherein the calculation unit is configured to calculate the decision variable based on the correlation.

7. The receiver circuit of claim 1, further comprising:
a maximum ratio combiner configured to generate an output signal based on symbol values of multiple channels and channel estimates of the multiple channels, wherein the decision variable depends on the output signal of the maximum ratio combiner.

8. The receiver circuit of claim 1, wherein the receiver circuit comprises multiple RAKE fingers, each one of the RAKE fingers is assigned to a transmission path of a multi-path channel, and the decision variable depends on at least one noise power of at least one of the transmission paths.

9. The receiver circuit of claim 1, wherein the ternary decision is based on a ternary alphabet comprising three ternary alphabet elements, wherein a non equal probability of each ternary alphabet element is assumed.

10. A receiver circuit, comprising:
a first estimation unit configured to estimate a noise power of a transmission channel used for a data transmission received at the receiver;
a calculation unit configured to calculate a decision variable based on the noise power;
a decision unit configured to make a ternary decision based on the decision variable;
a maximum ratio combiner;

a correlation unit configured to perform a correlation between a signal and a signature of an Acquisition Indicator Channel; and a second estimation unit configured to estimate a channel power of the Acquisition Indicator Channel, wherein the decision variable depends on a correlation between an output signal of the maximum ratio combiner and a signature of the Acquisition Indicator Channel and on the channel power of the Acquisition Indicator Channel.

11. A method, comprising:

estimating a noise power of a transmission channel used for a data transmission received at a receiver using a first estimation unit;

calculating a decision variable based on the noise power using a calculation unit;

making a ternary decision based on the decision variable using a decision unit;

estimating a channel coefficient; and providing the channel coefficient to a second estimation unit configured to estimate a channel power of a physical channel and providing the channel coefficient to a maximum ratio combiner.

12. A method, comprising:

estimating a noise power of a transmission channel used for a data transmission received at a receiver using a first estimation unit;

estimating a channel power of a physical channel used for an acquisition indicator transmission received at the receiver;

calculating a decision variable, wherein the decision variable is based on the noise power the transmission channel and the channel power of the physical channel; and making a ternary decision based on the decision variable.

13. The method of claim 12, wherein making the ternary decision comprises:

comparing the decision variable to a threshold value; and making the ternary decision based on a result of the comparison.

14. The method of claim 13, wherein the threshold value is a constant.

15. The method of claim 12, wherein making the ternary decision comprises:

comparing the decision variable to a threshold value, wherein the threshold value depends on at least one of the noise power of the transmission channel and the channel power of the physical channel; and making the ternary decision based on a result of the comparison.

16. The method of claim 12, wherein the transmission channel is an Acquisition Indicator Channel having a repeated sequence of access slots, and wherein the ternary decision is made for each access slot of an Acquisition Indicator Channel.

17. The method of claim 12, wherein making the ternary decision comprises deciding a value of an Acquisition Indicator over the Acquisition Indicator Channel indicating whether or not a predetermined signature was received.

18. The method of claim 12, further comprising:

correlating a signal corresponding to a transmission received at the receiver with an Acquisition Indicator Channel signature.

* * * * *